(12) United States Patent
Lares

(10) Patent No.: US 8,947,420 B2
(45) Date of Patent: Feb. 3, 2015

(54) PROCESSING IMAGE CONTENT FOR CONTENT MOTION OR TOUCH INPUT

(75) Inventor: Roland Lares, Ulm (DE)

(73) Assignee: Nokia Corporation, Espoo (FI)

( * ) Notice: Subject to any disclaimer, the term of this patent is extended or adjusted under 35 U.S.C. 154(b) by 488 days.

(21) Appl. No.: 13/117,950

(22) Filed: May 27, 2011

(65) Prior Publication Data

US 2012/0300123 A1 Nov. 29, 2012

(51) Int. Cl.
  G06T 1/00 (2006.01)
  H04N 7/01 (2006.01)
  G06F 3/0488 (2013.01)
  G06F 3/0486 (2013.01)
  G09G 5/00 (2006.01)

(52) U.S. Cl.
  CPC .............. H04N 7/01 (2013.01); G06F 3/0488 (2013.01); G06F 3/0486 (2013.01); G09G 5/006 (2013.01)
  USPC ........................... 345/418; 345/173; 345/473

(58) Field of Classification Search
  CPC ........ G04B 23/10; G04B 9/025; G04B 23/02; G04C 21/20; G04C 21/18; G06T 15/005; G06T 1/20; G06T 15/04; G09G 5/363; G09G 5/393; G09G 5/39; G09G 5/395; G06F 9/3851
  USPC ......................................... 345/418, 173, 473
  See application file for complete search history.

(56) References Cited

U.S. PATENT DOCUMENTS

| | | | |
|---|---|---|---|
| 6,816,163 B2 | 11/2004 | Antila | |
| 7,324,114 B2 | 1/2008 | Mutanen et al. | |
| 7,394,465 B2 | 7/2008 | Toni | |
| 8,345,768 B1* | 1/2013 | Hobbs et al. | 375/240.24 |
| 2011/0255841 A1* | 10/2011 | Remennik et al. | 386/248 |

OTHER PUBLICATIONS

"MPEG video in software: representation, transmission, and playback" by Lawrence A. Rowe ; Ketan D. Mayer-Patel ; Brian C. Smith ; Kim Liu—High-Speed Networking and Multimedia Computing, 134 (Apr. 1, 1994); pp. 1-11.*

"Temporal transcoding for mobile video communication" by Bonuccelli, M.A. ; Dipt. di Informatica, Pisa, Italy ; Lonetti, F. ; Martelli, F.—Mobile and Ubiquitous Systems: Networking and Services, 2005. MobiQuitous 2005. (Jul. 2005); pp. 1-5.*

"Workload Prediction and Dynamic Voltage Scaling for MPEG Decoding" by Ying Tan Parth Malani Qinru Qiu Qing Wu—Design Automation, 2006. Asia and South Pacific Conference on (Jan. 2006), pp. 911-916.*

* cited by examiner

Primary Examiner — Maurice L McDowell, Jr.
(74) Attorney, Agent, or Firm — Alston & Bird LLP

(57) ABSTRACT

An example apparatus for rendering frames of an image is caused to measure a processing load of the apparatus, and as a function thereof, estimate a target point in time at which the apparatus may render the next frame. The apparatus is caused to identify a frame having an associated point in time at or after the target point in time, and render the identified frame of the plurality of frames. The apparatus of another aspect is caused to receive an indication of a motional touch gesture to move a GUI element, and in response thereto, direct presentation of the GUI element. The apparatus is caused to extrapolate a position for a point in time based on a number of previous touch positions of the touch gesture. And the apparatus is caused to direct presentation of the GUI element at the extrapolated position at the given point in time.

8 Claims, 17 Drawing Sheets

PROCESSING IMAGE CONTENT FOR CONTENT MOTION OR TOUCH INPUT

TECHNICAL FIELD

The present invention generally relates to video content and, more particularly, relates to processing image content for content motion or touch input.

BACKGROUND

Many portable devices use a display for presenting information to the user. Some devices have a touch-enabled display for not only presenting information but receiving user input. A GUI (graphical user interface) may have movable elements whose content and/or position change over time. The "smoothness" and "responsiveness" impressions of a GUI as human perception may depend on the frame rate and refresh rate of the device. The "responsiveness" impression of a GUI may further depend on correlation between touch position and GUI content, such as for motional touch inputs like "dragging" or "flicking" gestures.

The frame rate may refer to the frequency at which the device produces (renders) successive instances of an image, referred to as frames. The frame rate may therefore be given in terms of frames per second (fps) or hertz (Hz, or cycles per second). The refresh rate, on the other hand, may refer to the frequency at which a display may draw the produced image, which may be given in terms of Hz.

Many mobile devices use an internal frame buffer in order to lower the power consumption. This type of device may produce (render) a frame of an image in the frame buffer, which may occur in horizontal lines from the top to the bottom of the image. The content of the frame buffer may be continuously transferred to a display, which may similarly occur in horizontal lines from the top to the bottom of the image. The refresh rate may refer to the rate at which the device may transfer the content of the frame buffer to the display, and hence the rate at which the display may present the content. In parallel, the device may produce the next frame of the image in the frame buffer. The frame rate may refer to the rate at which the device produces frames of the image in the frame buffer.

Image tearing is a well-known problem in displaying computer-generated animations, which may occur when the production of frames of an image in the frame buffer overtakes the transfer from the frame buffer to the display or vice versa. Here, the device produces in the frame buffer a part of the image that has not yet been refreshed on the display. The display then includes a portion of the image of one frame at the top of the display, and a portion of the image of the next frame at the bottom of the display. When the content of the two frames are different, the result is a torn image, which may appear as flickering to a user. Image tearing may be avoided in any of a number of different manners, such as by means of a synchronization signal (or tearing enable (TE) signal) that may prevent the device from producing the next frame of an image in the frame buffer until after the display has been refreshed with the current frame of the image in the frame buffer. The synchronization signal may therefore serve to synchronize or otherwise align the frame and refresh rates. Additional judder may be perceived, however, when the frame rate is lower than the display refresh rate.

The processing power of many portable devices may be limited. This limitation may affect the frame rate capability of the devices, resulting in a lower nominal frame rate than otherwise may be achievable by a less limited device. And for movable GUI elements, this may result in a clearly visible and undesirable displacement between the touched position and the displayed GUI element whenever these elements are moved with at least a particular speed.

The multitasking nature of many devices also may make it difficult to always have the requisite processing power available to achieve the device's nominal frame rate. This dynamic processor load may lead to an effective frame rate lower than the device's nominal frame rate such that the average effective GUI frame rate as generated by the graphics engine may be some rational factor (/2 . . . /8) below the refresh rate of the display (e.g., 60 Hz). The delayed rendering of a frame of GUI content may result in lower effective frame rate relative to when the display's refresh rate makes it ready to present the frame.

The aforementioned characteristics may result in a violation in the position and time relationship (motion) for movable GUI elements, when it is finally shown on the display. It may also result in a visible spatial displacement for movable GUI elements when they finally appear on the display. Additional judder may also occur, which may be clearly visible for horizontal and/or vertical moving GUI elements.

BRIEF SUMMARY

In light of the foregoing background, example embodiments of the present invention provide an improved apparatus, method and computer-readable storage medium for processing video content for content motion or touch input. Various aspects of example embodiments of the present invention are directed to an apparatus including at least one processor and at least one memory including computer program code. The memory/memories and computer program code are configured to, with processor(s), cause the apparatus to at least perform a number of operations.

The apparatus of one aspect is caused to render a plurality of frames of an image (e.g., GUI). The plurality of frames is rendered at a dynamic, effective frame rate, and each frame includes an associated point of time for having rendered the frame at a suppositional frame rate of the apparatus. Rendering the plurality of frames includes a plurality of operations. In this regard, the apparatus may be caused to measure a processing load of the apparatus. After rendering a current frame of the plurality of frames of the image, the apparatus may be caused to estimate a target point in time at which the apparatus is capable of rendering a next frame of the plurality of frames of the image, where the target point in time is estimated as a function of the processing load. The apparatus may then be caused to identify a frame of the plurality of frames after the current frame having an associated point in time at or after the target point in time. And the apparatus may be caused to render the identified frame of the plurality of frames, skipping rendering any frame between the current frame and identified frame.

The apparatus of another aspect is caused to receive an indication of a motional touch gesture to move a GUI element on a display. The motional touch gesture includes a plurality of successive touch positions on the display at a corresponding plurality of points in time. In response to receiving the indication of the motional touch gesture, the apparatus may be caused to direct presentation of the GUI element on the display at a plurality of successive positions at the corresponding plurality of points in time to thereby represent movement of the GUI element on the display. In this regard, the plurality of successive positions of the GUI element is representative of the plurality of successive touch positions. Then, for directing presentation of the GUI element, the apparatus may be caused to extrapolate a position of the GUI element for a given point in time based on a number of the touch positions at points in time prior to the given point in time, and based on an extrapolation function into which the number of touch positions are input. And the apparatus may be caused to direct presentation of the GUI element at the extrapolated position at the given point in time.

BRIEF DESCRIPTION OF THE DRAWINGS

Figure 1:
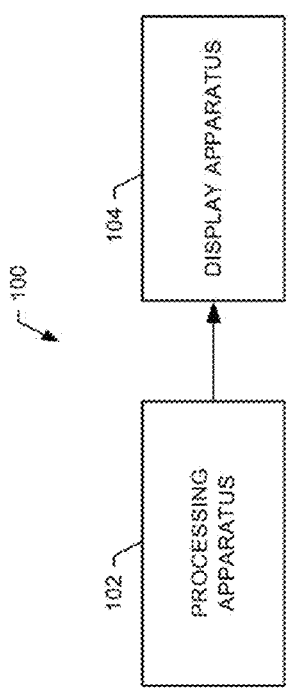
Figure 2:
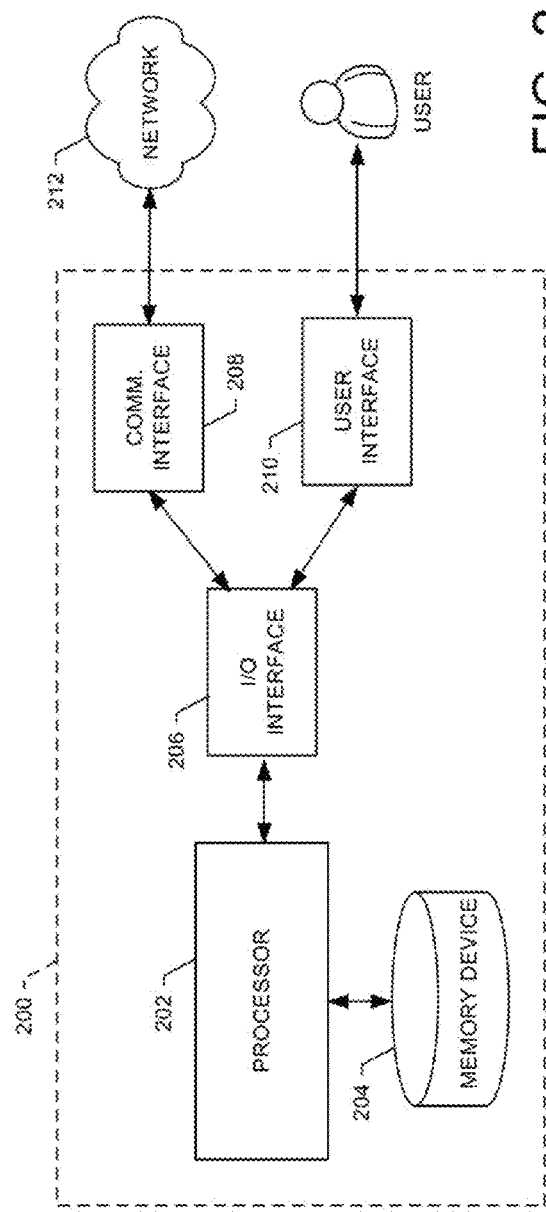
Figure 7:
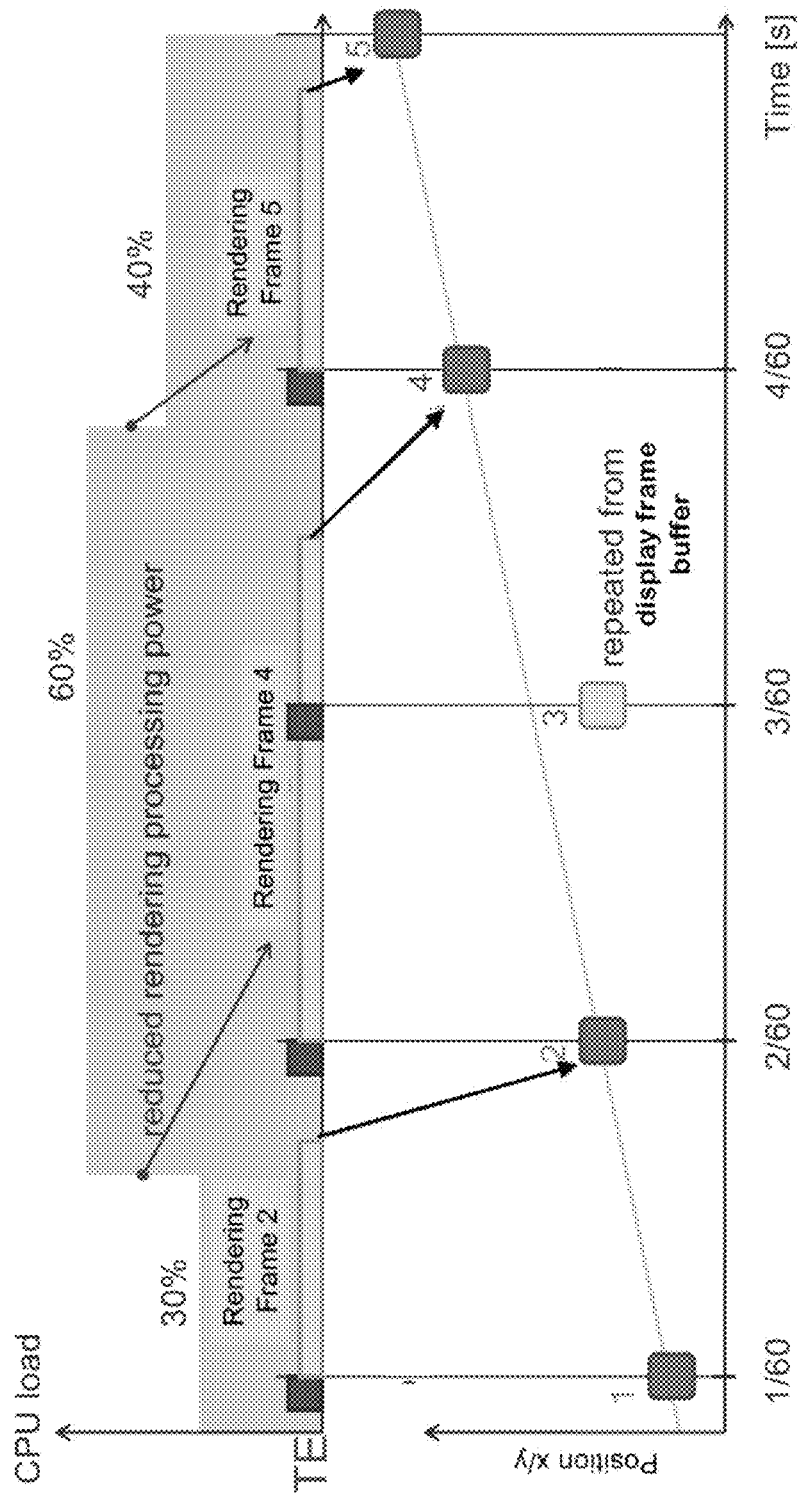
Figure 8:
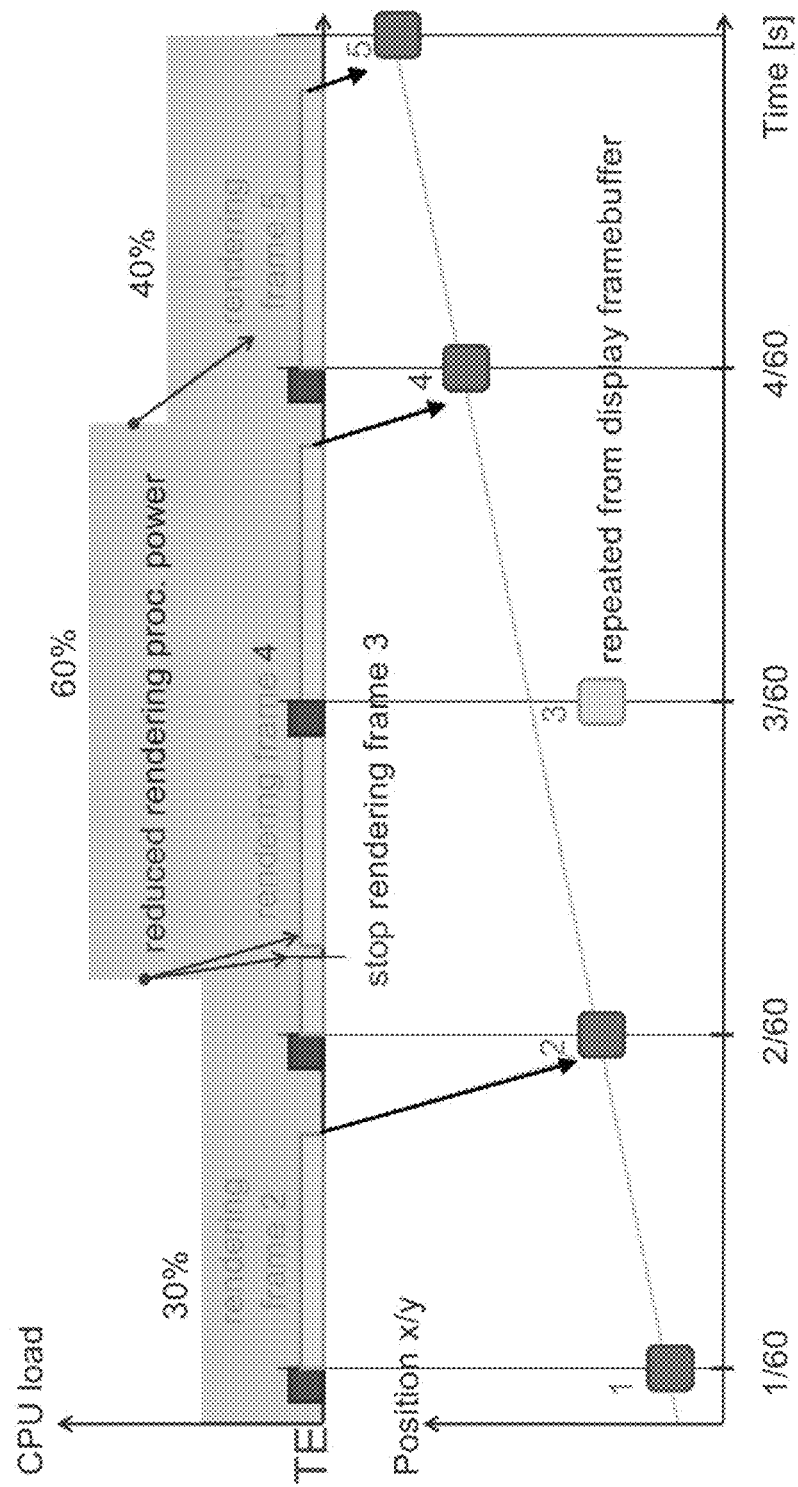
Figure 9:
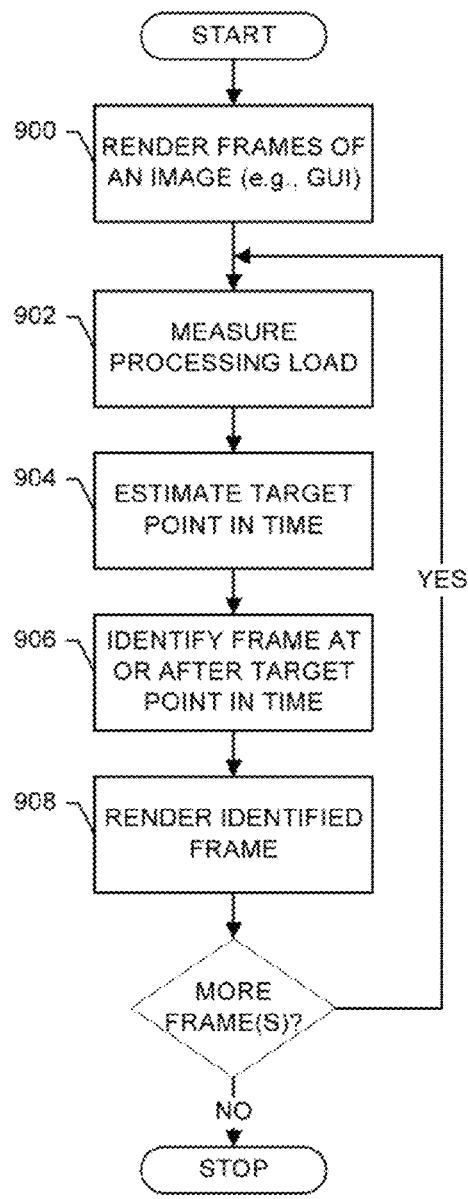
Figure 10:
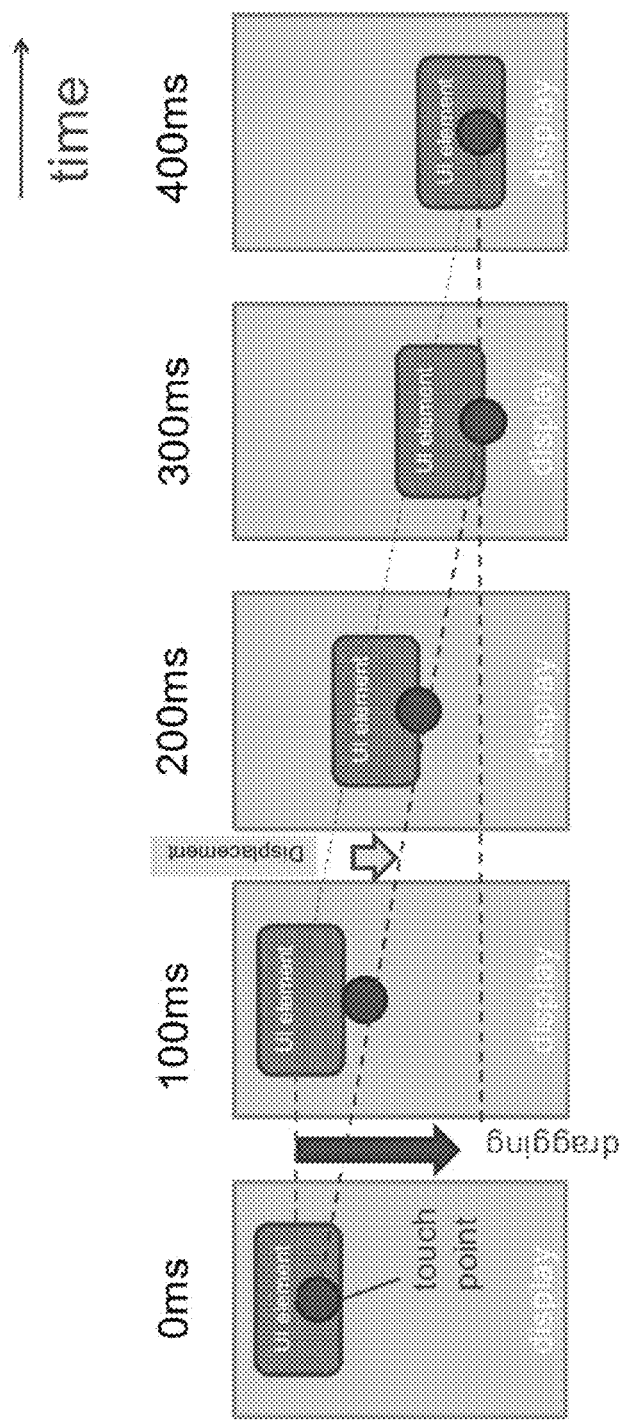
Figure 11:
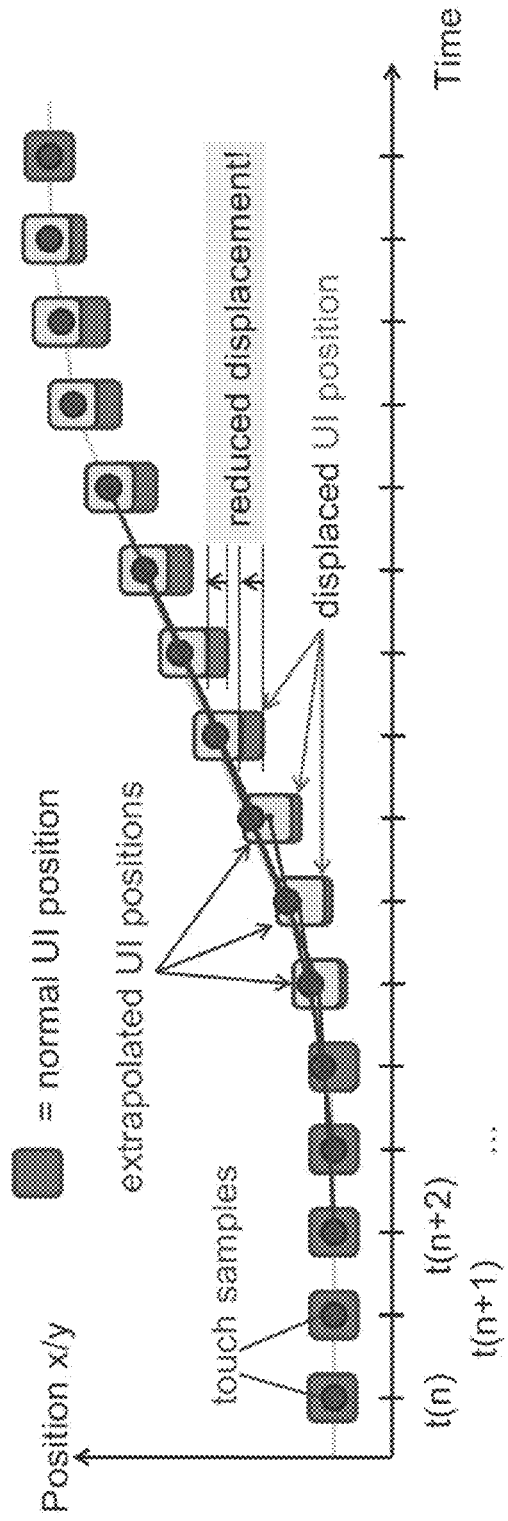
Figure 12:
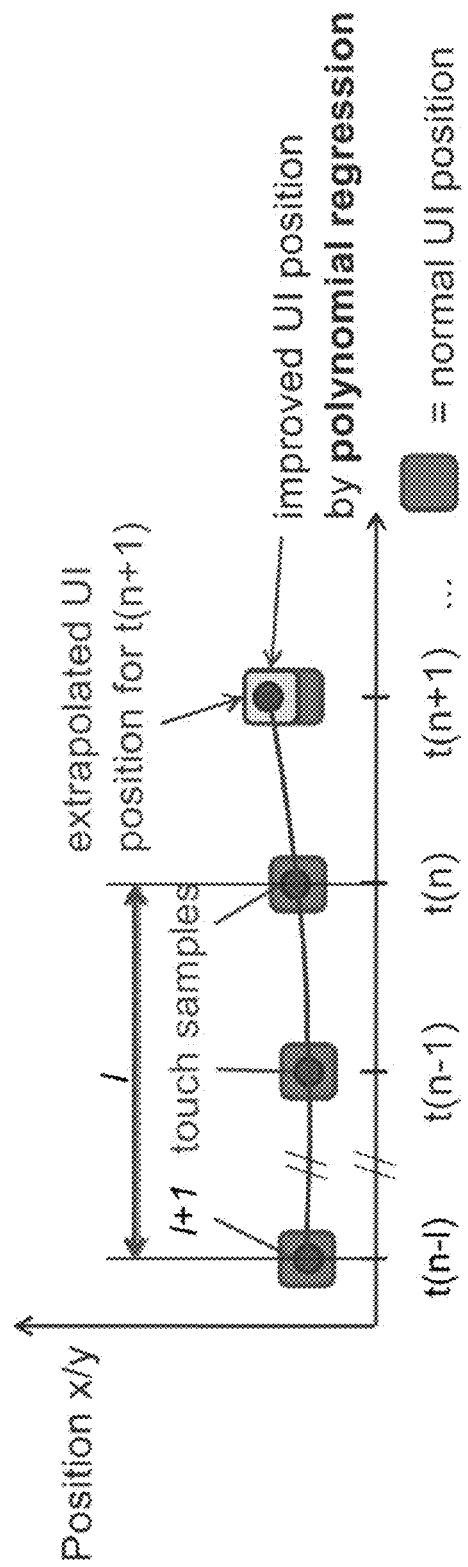
Figure 13:
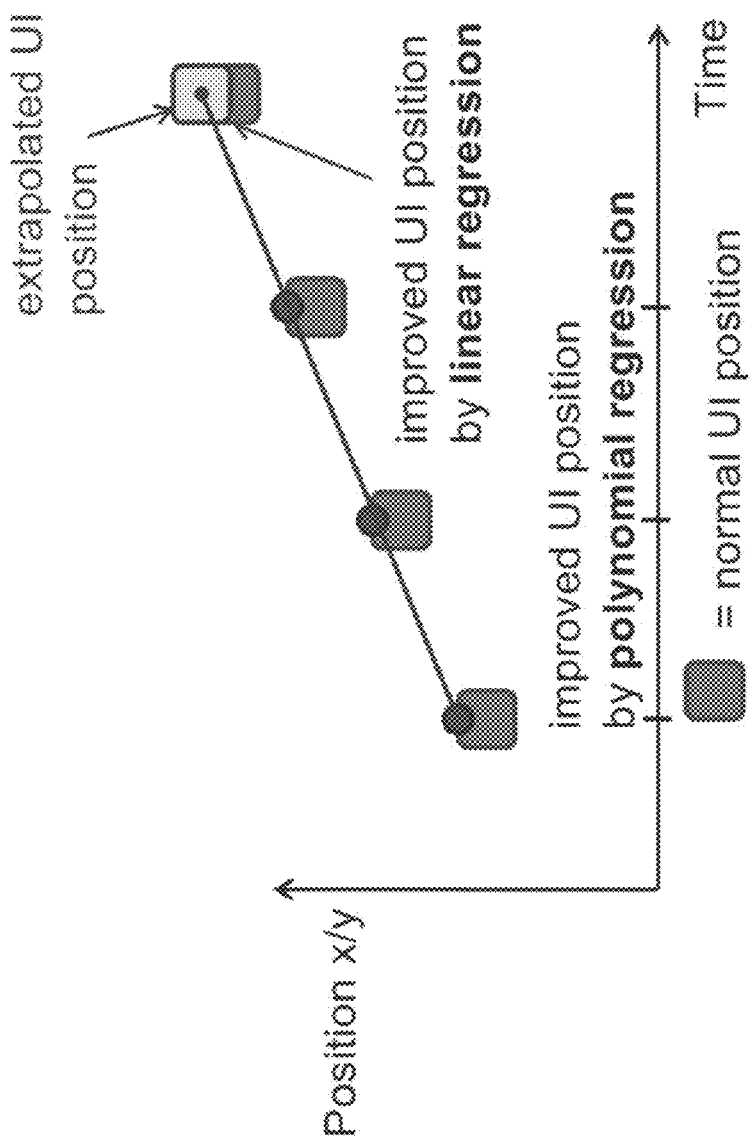
Figure 14:
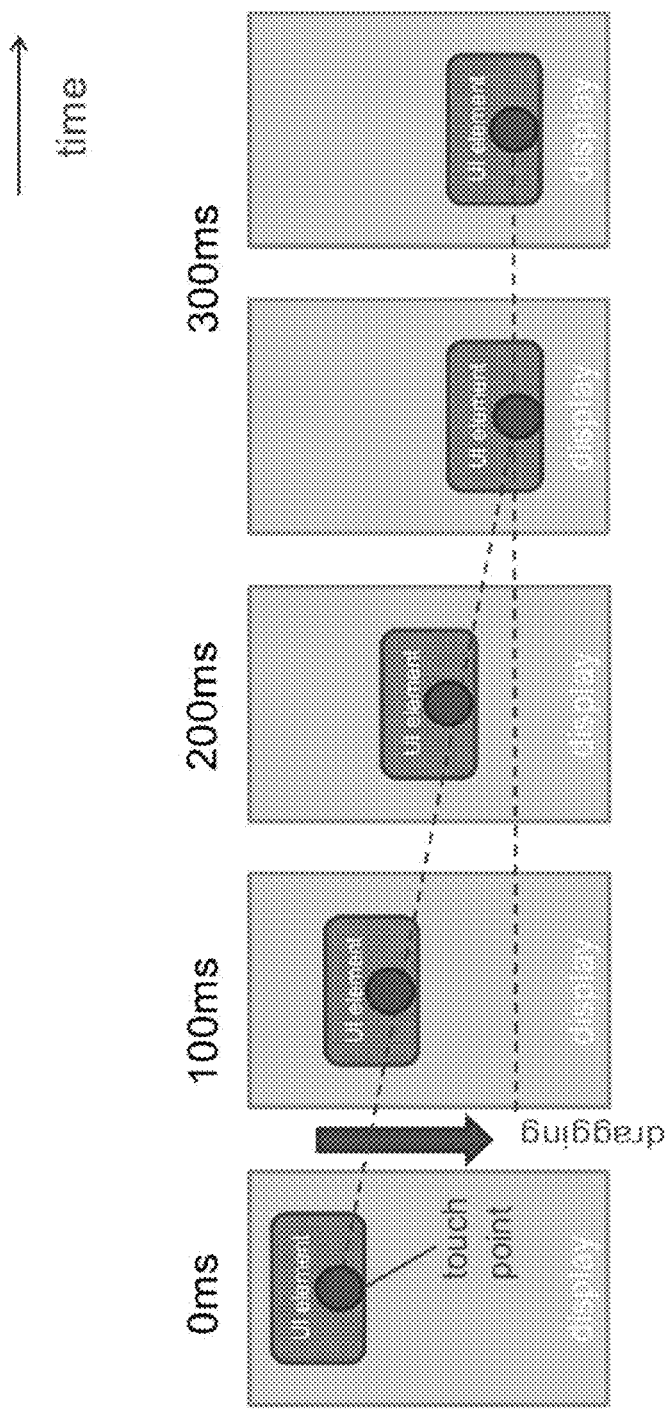
Figure 15:
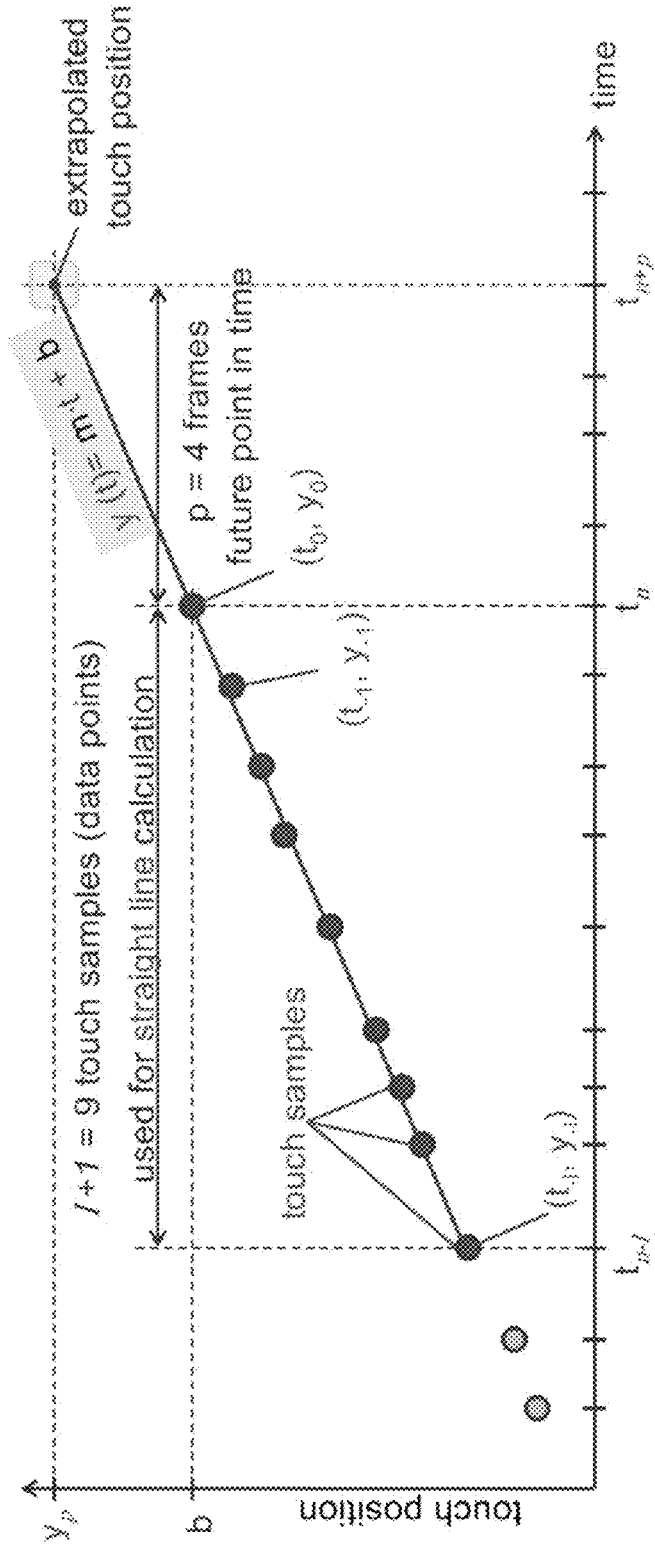
Figure 16:
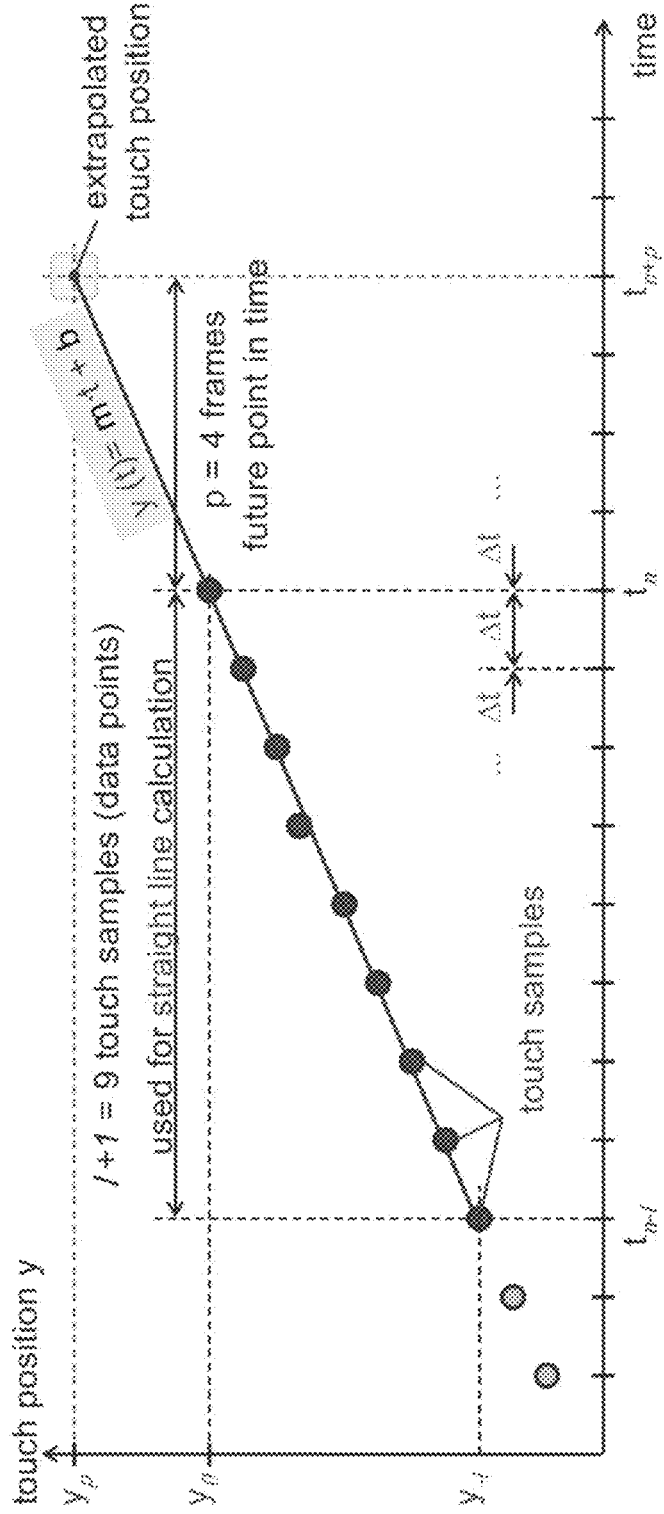
Figure 17:
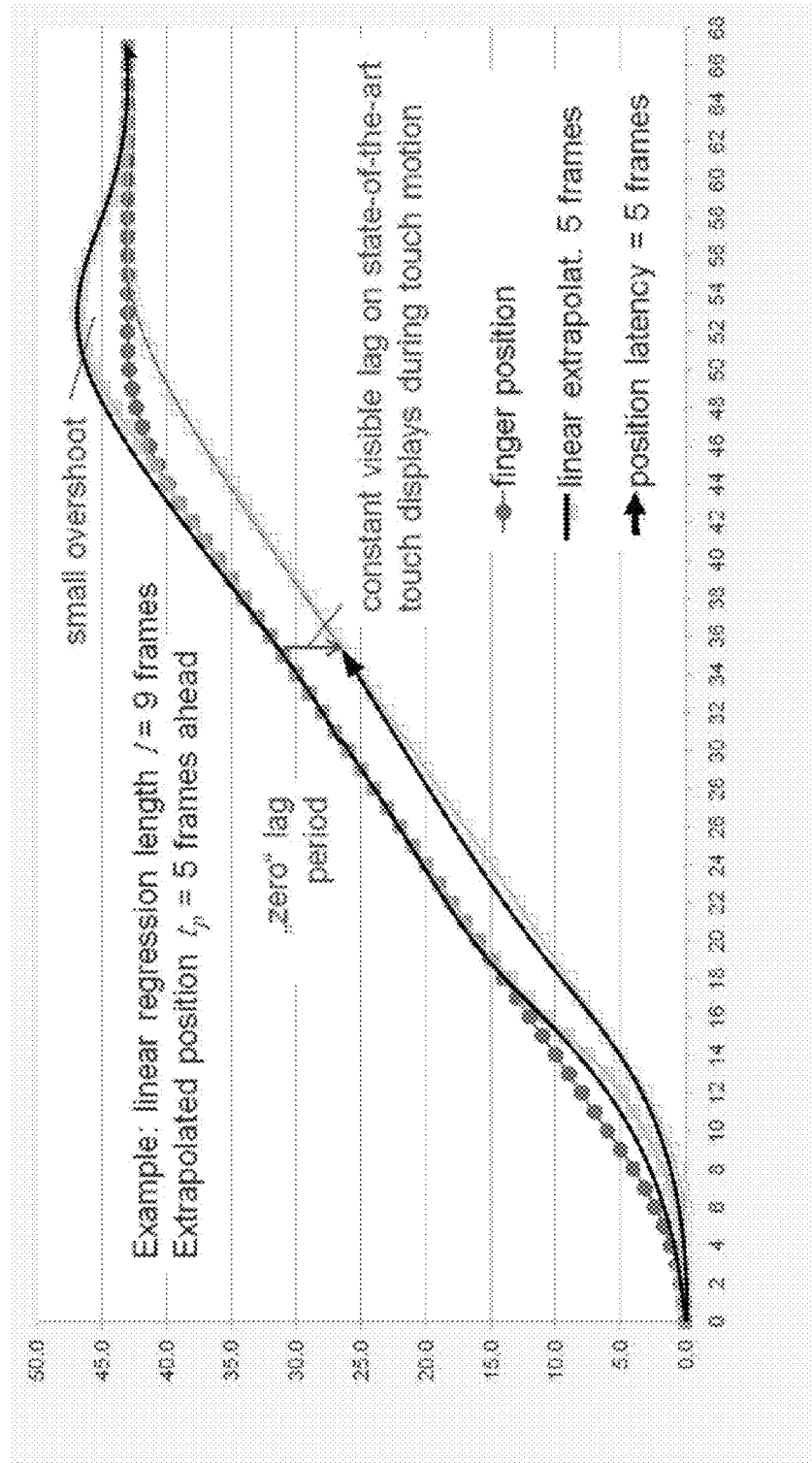
Figure 18:
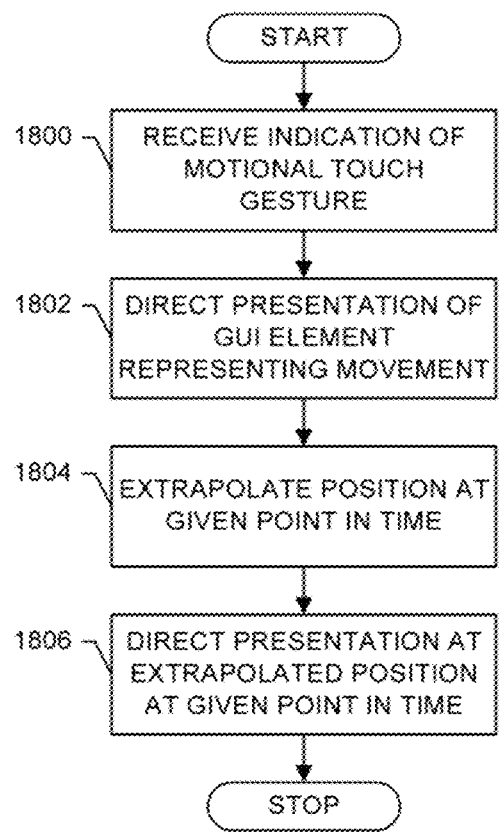

Having thus described the invention in general terms, reference will now be made to the accompanying drawings, which are not necessarily drawn to scale, and wherein:

FIG. 1 is a block diagram of a system in accordance with example embodiments of the present invention;

FIG. 2 is a schematic block diagram of the apparatus of the system of FIG. 1, in accordance with example embodiments of the present invention;

FIGS. 3-6 are graphs illustrating the position change of an example GUI element moving over time, according to example embodiments of the present invention;

FIGS. 7 and 8 are graphs further illustrating rendering frames according to example embodiments of the present invention;

FIG. 9 is a flowchart illustrating various operations in a method according to example embodiments of the present invention;

FIG. 10 is a schematic illustrating a motional touch input to move a GUI element, according to example embodiments of the present invention;

FIGS. 11-13 are schematic graphs illustrating extrapolating position(s) of a GUI element based on previous touch positions, according to example embodiments of the present invention;

FIG. 14 is a schematic illustrating a motional touch input to move a GUI element after extrapolating the position(s) of the GUI element, according to example embodiments of the present invention;

FIGS. 15-17 are graphs illustrating a linear regression technique for extrapolating GUI element positions, according to example embodiments; and FIG. 18 is a flowchart illustrating various operations in a method according to other example embodiments of the present invention.

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Reference may be made herein to terms specific to a particular system, architecture or the like, but it should be understood that example embodiments of the present invention may be equally applicable to other similar systems, architectures or the like.

The terms "data," "content," "information," and similar terms may be used interchangeably, according to some example embodiments of the present invention, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Further, as used herein, the term "circuitry" refers to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory/memories that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Referring to FIG. 1, an illustration of one system that may benefit from the present invention is provided. The system, method and computer-readable storage medium of exemplary embodiments of the present invention will be primarily described without respect to the environment in which the system, method and computer-readable storage medium operate. It should be understood, however, that the system, method and computer-readable storage medium may operate in a number of different environments, including mobile and/or fixed environments, wireline and/or wireless environments, standalone and/or networked environments or the like. For example, the system, method and computer-readable storage medium of exemplary embodiments of the present invention can operate in mobile communication environments whereby mobile terminals operating within one or more mobile networks include or are otherwise in communication with one or more sources of multimedia content.

The system 100 includes a processing apparatus 102 and display apparatus 104. Although shown as separate components, it should be understood that in some embodiments, a single apparatus may support both of the processing apparatus and display apparatus, logically separated but co-located within the respective entity. For example, a mobile terminal may support a logically separate, but co-located, processing apparatus and display apparatus.

The processing apparatus 102 may comprise any of a number of different components configured to process data, content or the like according to example embodiments of the present invention. According to example embodiments, the processing apparatus may be configured to produce (render) images for display by the display apparatus 104. The display apparatus may therefore include any of a number of different components configured to display or otherwise present the produced images from the processing apparatus according to example embodiments of the present invention. In addition, the display apparatus may include or otherwise be in communication with a touch-sensitive surface configured to receive user input. Thus, in various example embodiments, the display apparatus may be implemented as a touch-screen display.

According to example embodiments, the images that may be produced for display may include any of a number of different types of images, such as in one example, a graphical user interface (GUI) that may have one or more movable elements whose content and/or position change over time. Likewise, the processing apparatus 102 and display apparatus 104 may produce and display images in any of a number of different manners. In one example, the processing apparatus and display apparatus may employ one or more internal frame buffers into and out of which content may be continuously produced and read. In this example, the processing apparatus may produce (or render) successive frames of an image in a frame buffer at a frame rate (that may be dynamic), from which the display apparatus may read content for display at a refresh rate. The processing apparatus and display apparatus may further employ any of a number of different techniques to avoid image tearing, such as by employing a synchronization signal (or tearing enable (TE) signal).

In the context of a GUI, the frame rate may refer to the frequency at which the processing apparatus 102 produces frames of the GUI and its elements. In this regard, the processing apparatus may produce a frame of the GUI at each of a plurality of points in time. Also in the context of a GUI, the refresh rate may refer to the frequency at which the content of the frame buffer may be transferred to the display apparatus 104, and hence the rate at which the display apparatus may present the content. And like frames of the GUI, the processing apparatus and display apparatus may be considered to produce and display frames of the GUI elements at respective frame and refresh rates.

Reference is now made to FIG. 2, which illustrates an apparatus 200 that may be configured to function as the processing apparatus 102 and display apparatus 104 to perform example methods of the present invention. In some example embodiments, the apparatus may, be embodied as, or included as a component of, a communications device with wired or wireless communications capabilities. The example apparatus may include or otherwise be in communication with one or more processors 202, memory devices 204, Input/Output (I/O) interfaces 206, communications interfaces 208 and/or user interfaces 210 (one of each being shown).

The processor 202 may be embodied as various means for implementing the various functionalities of example embodiments of the present invention including, for example, one or more of a microprocessor, a coprocessor, a controller, a special-purpose integrated circuit such as, for example, an ASIC (application specific integrated circuit), an FPGA (field programmable gate array), DSP (digital signal processor), or a hardware accelerator, processing circuitry or other similar hardware. According to one example embodiment, the processor may be representative of a plurality of processors, or one or more multi-core processors, operating individually or in concert. A multi-core processor enables multiprocessing within a single physical package. Examples of a multi-core processor include two, four, eight, or greater numbers of processing cores. Further, the processor may be comprised of a plurality of transistors, logic gates, a clock (e.g., oscillator), other circuitry, and the like to facilitate performance of the functionality described herein. The processor may, but need not, include one or more accompanying digital signal processors (DSPs). A DSP may, for example, be configured to process real-world signals in real time independent of the processor. Similarly, an accompanying ASIC may, for example, be configured to perform specialized functions not easily performed by a more general purpose processor. In some example embodiments, the processor is configured to execute instructions stored in the memory device or instructions otherwise accessible to the processor. The processor may be configured to operate such that the processor causes the apparatus to perform various functionalities described herein.

Whether configured as hardware alone or via instructions stored on a computer-readable storage medium, or by a combination thereof, the processor 202 may be an apparatus configured to perform operations according to embodiments of the present invention while configured accordingly. Thus, in example embodiments where the processor is embodied as, or is part of, an ASIC, FPGA, or the like, the processor is specifically configured hardware for conducting the operations described herein. Alternatively, in example embodiments where the processor is embodied as an executor of instructions stored on a computer-readable storage medium, the instructions specifically configure the processor to perform the algorithms and operations described herein. In some example embodiments, the processor is a processor of a specific device configured for employing example embodiments of the present invention by further configuration of the processor via executed instructions for performing the algorithms, methods, and operations described herein.

The memory device 204 may be one or more computer-readable storage media that may include volatile and/or non-volatile memory. In some example embodiments, the memory device includes Random Access Memory (RAM) including dynamic and/or static RAM, on-chip or off-chip cache memory, and/or the like. Further, the memory device may include non-volatile memory, which may be embedded and/or removable, and may include, for example, Read-Only Memory (ROM), flash memory, magnetic storage devices (e.g., hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor 202.

Further, the memory device 204 may be configured to store information, data, applications, computer-readable program code instructions, and/or the like for enabling the processor 202 and the example apparatus 200 to carry out various functions in accordance with example embodiments of the present invention described herein. For example, the memory device may be configured to buffer input data for processing by the processor. Additionally, or alternatively, the memory device may be configured to store instructions for execution by the processor. The memory may be securely protected, with the integrity of the data stored therein being ensured. In this regard, data access may be checked with authentication and authorized based on access control policies.

The I/O interface 206 may be any device, circuitry, or means embodied in hardware, software or a combination of hardware and software that is configured to interface the processor 202 with other circuitry or devices, such as the communications interface 208 and/or the user interface 210. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the apparatus 200 to perform, various functionalities of an example embodiment of the present invention.

The communication interface 208 may be any device or means embodied in hardware, software or a combination of hardware and software that is configured to receive and/or transmit data from/to one or more networks 212 and/or any other device or module in communication with the example apparatus 200. The processor 202 may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. Via the communication interface, the example apparatus may communicate with various other network elements in a device-to-device fashion and/or via indirect communications.

The communications interface 208 may be configured to provide for communications in accordance with any of a number of wired or wireless communication standards. The communications interface may be configured to support communications in multiple antenna environments, such as multiple input multiple output (MIMO) environments. Further, the communications interface may be configured to support orthogonal frequency division multiplexed (OFDM) signaling. In some example embodiments, the communications interface may be configured to communicate in accordance with various techniques including, as explained above, any of a number of second generation (2G), third generation (3G), fourth generation (4G) or higher generation mobile communication technologies, radio frequency (RF), infrared data association (IrDA) or any of a number of different wireless networking techniques. The communications interface may also be configured to support communications at the network layer, possibly via Internet Protocol (IP).

The user interface 210 may be in communication with the processor 202 to receive user input via the user interface and/or to present output to a user as, for example, audible, visual, mechanical or other output indications. The user interface may include, for example, a keyboard, a mouse, a joystick, a display (e.g., a touch-screen display), a microphone, a speaker, or other input/output mechanisms. Further, the processor may comprise, or be in communication with, user interface circuitry configured to control at least some functions of one or more elements of the user interface. The processor and/or user interface circuitry may be configured to control one or more functions of one or more elements of the user interface through computer program instructions (e.g., software and/or firmware) stored on a memory accessible to the processor (e.g., the memory device 204). In some example embodiments, the user interface circuitry is configured to facilitate user control of at least some functions of the apparatus 200 through the use of a display (e.g., display apparatus 104) and configured to respond to user inputs. The processor may also comprise, or be in communication with, display circuitry configured to display at least a portion of a user interface, the display and the display circuitry configured to facilitate user control of at least some functions of the apparatus.

In some cases, the apparatus 200 of example embodiments may be implemented on a chip or chip set. In an example embodiment, the chip or chip set may be programmed to perform one or more operations of one or more methods as described herein and may include, for instance, one or more processors 202, memory devices 204, I/O interfaces 206 and/or other circuitry components incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip or chip set can be implemented in a single chip. It is further contemplated that in certain embodiments the chip or chip set can be implemented as a single "system on a chip." It is further contemplated that in certain embodiments a separate ASIC may not be used, for example, and that all relevant operations as disclosed herein may be performed by a processor or processors. A chip or chip set, or a portion thereof, may constitute a means for performing one or more operations of one or more methods as described herein.

In one example embodiment, the chip or chip set includes a communication mechanism, such as a bus, for passing information among the components of the chip or chip set. In accordance with one example embodiment, the processor 202 has connectivity to the bus to execute instructions and process information stored in, for example, the memory device 204. In instances in which the apparatus 200 includes multiple processors, the processors may be configured to operate in tandem via the bus to enable independent execution of instructions, pipelining, and multithreading. In one example embodiment, the chip or chip set includes merely one or more processors and software and/or firmware supporting and/or relating to and/or for the one or more processors.

As suggested in the background section, the "smoothness" and "responsiveness" impressions of a GUI as human perception may depend on the frame and refresh rates of the processing apparatus 102 and display apparatus 104. The "responsiveness" impression may further depend on correlation between touch position and GUI content, such as for motional touch inputs like "dragging" or "flicking" gestures. Example embodiments of the present invention are directed to processing video content for content motion or touch input in a manner that may improve "smoothness" and "responsiveness." The video content may be processed for either or both content motion or touch input, each of which will be separately described below.

A. Processing for Content Motion

Example embodiments of the present invention may improve the GUI "smoothness" by taking the position and time relationship (motion) for movable GUI elements into account, especially when the processing power and frame rate of the processing apparatus 102 is limited. In this regard, the processing load may be dynamic and depend on the actual ongoing tasks performed by the system 100. As application software of the system itself may produce the GUI, and as all actual running processes may be known, a measure for the processing load of the processing apparatus may be available. And with this actual measure, the processing load for a short time period of (e.g., ~50 msec) may be estimated. Depending on the use case and running applications, there may exist some unexpected interruptions in the short time period (e.g., WLAN, USB query, etc.), but most of these interruptions may be postponed for a short time period without significantly impacting system behavior.

Consider, for example, that an image may be produced and displayed in successive frames each of which may have a number and, from a suppositional frame rate of the system 100, a point in time at which the frame should be produced and available in the frame buffer to be pulled to the display apparatus 104. In accordance with these example embodiments of the present invention, after producing a current frame of a GUI and before producing the next frame, a measure of the processing load may be used to estimate a target point in time when the next frame may be produced. And optionally, some headroom period of time may be further considered in estimating the target point in time to account for unexpected interruptions such as those described above. This target point in time may then be used to identify a frame at or after the target point in time, such as the first frame at or after the target point in time. The processing apparatus may then produce this frame as the next frame, and may skip rendering any frame between the current frame and identified frame. This process of example embodiments may result in less judder and may improve the perceived "smoothness" of the GUI for a system user.

Figure 3:
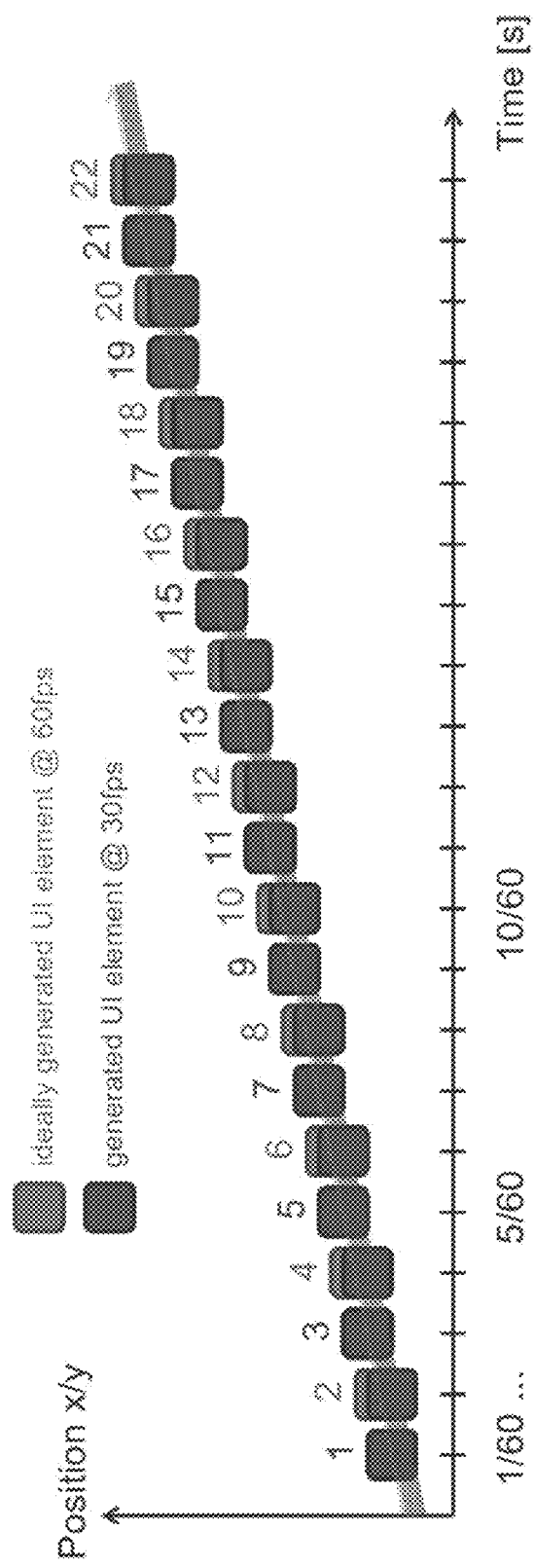

To illustrate these example embodiments, consider the graphs of FIGS. 3-6 which illustrate the position change of an example GUI element moving at a constant rate approximately equal to the refresh rate of the display, which in this example is 60 Hz. FIG. 3 illustrates the position change of the movable GUI element in an instance in which the element is produced (rendered) at 60 fps corresponding to the 60 Hz refresh rate, and then at 30 fps which corresponds to a rate lower than the 60 Hz refresh rate. This lower rate may in one example correspond to a suppositional frame rate. As shown, the frame numbers correspond to those at the refresh rate of the display for purposes of illustration. At the lower rate, in instances in which the display refreshes before the next successive frame is produced, the same current frame may be again copied from the frame buffer. And at these instances for the lower frame rate, the display may experience some judder (represented by an offset between the 60 Hz and corresponding 30 Hz rendered GUI element at every other frame).

Figure 4:
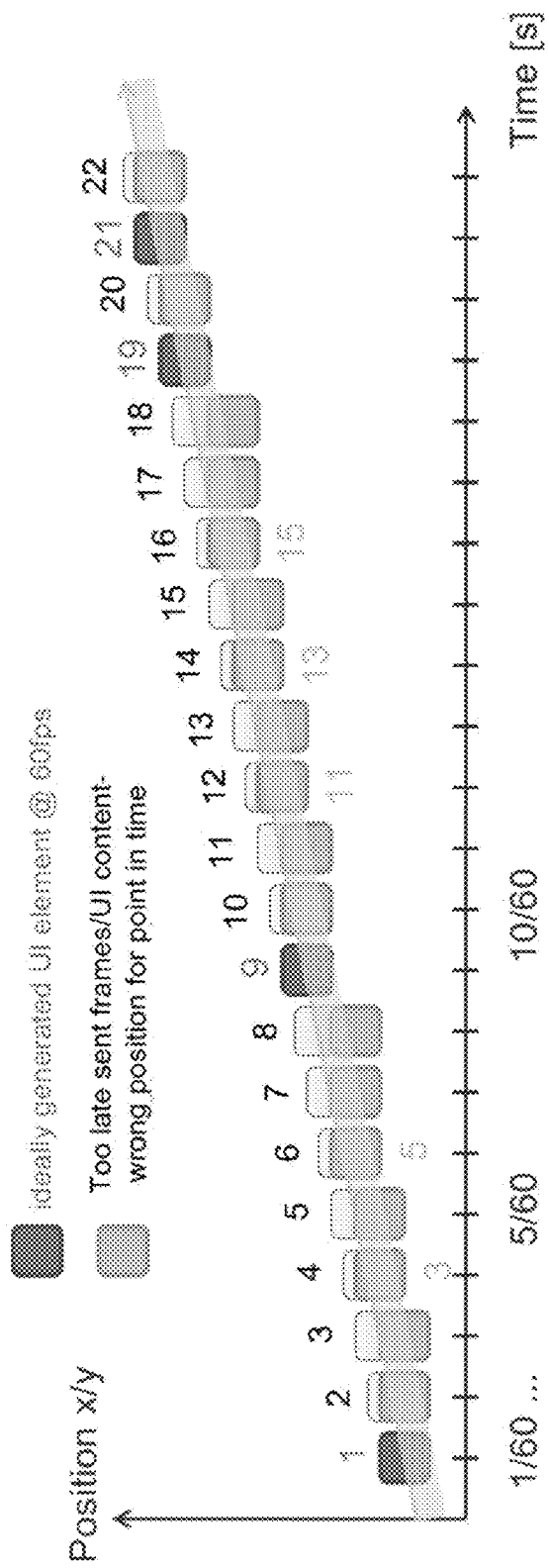

FIG. 4 illustrates the position change of the movable GUI element again in an instance in which the element is produced in average below 30 fps. That is, instead of illustrating the position change of the GUI element at the suppositional frame rate of 30 fps, FIG. 4 illustrates the position change of the GUI element at an even lower effective frame rate, which may be due to a lack of processing resources to achieve the suppositional frame rate. Again, at the lower rate, in instances in which the display refreshes before the next successive frame is produced, the same current frame may be again copied from the frame buffer. But at the even lower effective rate, not only may the display experience an offset in position, but the display may experience an offset in time. That is, at the lower effective rate, for at least one frame of the GUI element, the longer amount of time required to produce the frame in the frame buffer may result in the GUI element being sent from the frame buffer to the display after the time for which the frame was produced. This may result in even more judder than by the suppositional frame rate just being lower than the constant rate of movement of the GUI element/refresh rate of the display.

More particularly, as shown, the processing apparatus 102 produces frame 1 in the frame buffer, and at time $1/60$ seconds, the display apparatus 104 reads frame 1 from the frame buffer. At the 30 Hz suppositional rate, the processing apparatus next produces the next successive frame (shown as frame 3 at the 30 Hz rate), and at the next display refresh, copies frame 1 from the frame buffer. Notionally, frame 3 should be produced and available for the display apparatus at time $3/60$ s, but due to a lack of processing resources, the processing apparatus may not yet have completed production of frame 3 by time $3/60$. The display apparatus thus once again pulls frame 1 from the frame buffer at time $3/60$. The processing apparatus thereafter completes production of frame 3 in the frame buffer, and the display apparatus pulls frame 3 from the frame buffer for display but not until time $4/60$ —after the time intended for frame 3 (according to the suppositional frame rate).

Figure 5:
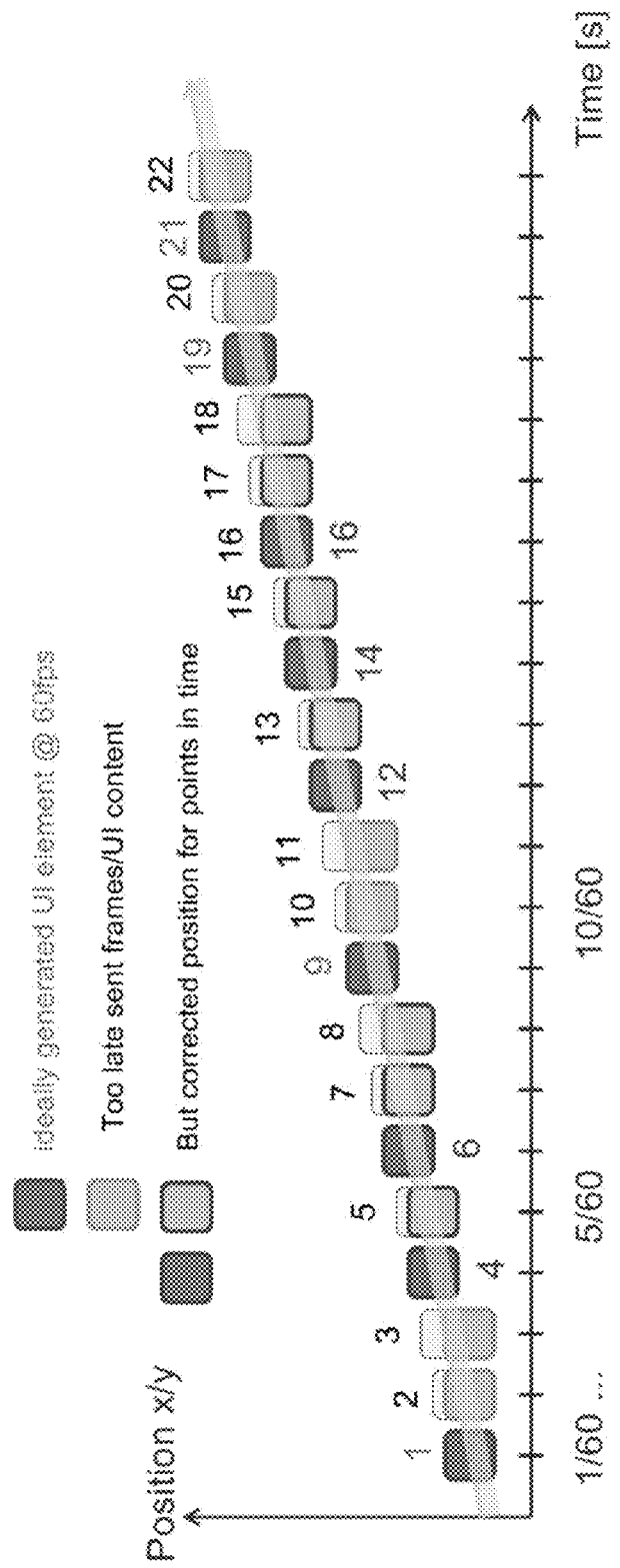
Figure 6:
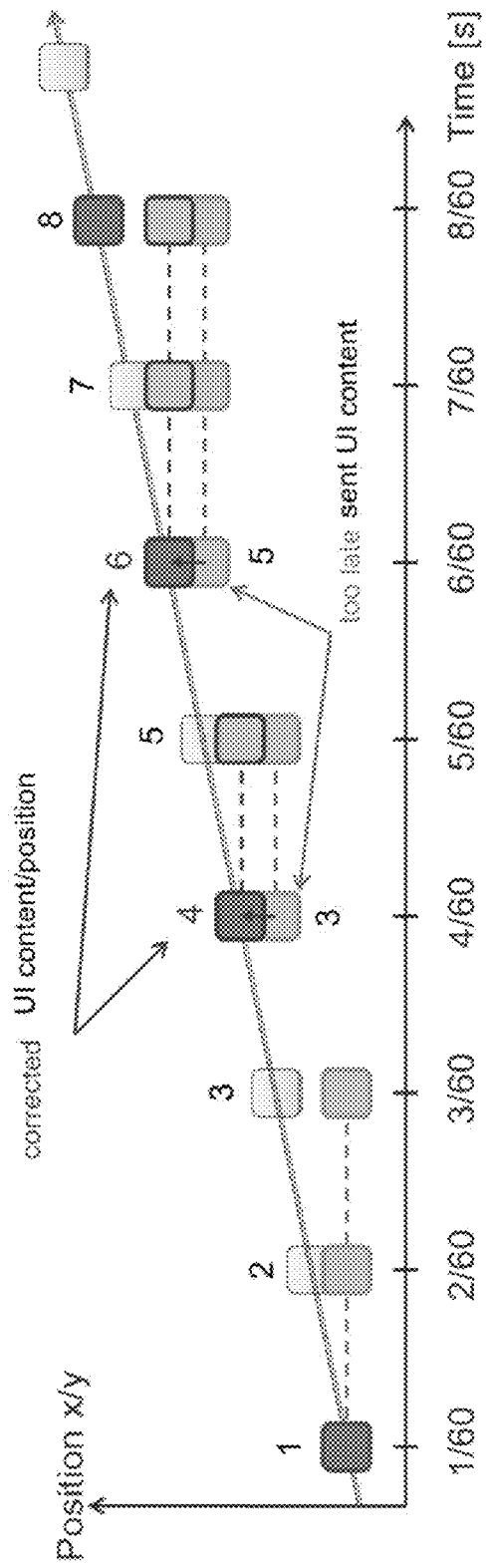

Now, FIGS. 5 and 6 continue the graph of FIG. 4, but now add the position change of the movable GUI element according to example embodiments of the present invention. As shown, according to example embodiments, the positions at which the GUI element is produced too late to be presented on time may be corrected. This may reduce the perceived judder relative to the effective frame rate. FIG. 6 more particularly illustrates the correction according to one example embodiment. As shown, after producing frame 1 and before producing frame 3, the processing apparatus 102 may measure its processing load, and optionally with any further headroom, and may estimate a target point in time when the next frame may be produced. In this example, the target point in time may be any point after time $3/60$ and before $4/60$. The processing apparatus may then use this target point in time to identify frame 4 as the first frame at or after the target point in time. Instead of next producing frame 3, then, the processing apparatus may produce frame 4 as the next frame. The process may then similarly continue, and as shown in FIG. 6, may result in corrected frames 4 and 6 produced instead of late frames 3 and 5 (and in FIG. 5, further corrected frames 12, 14 and 16).

FIG. 7 further illustrates example embodiments including an illustration of processing load and a tearing enable (TE) signal that may prevent the processing apparatus 102 from producing the next frame of the GUI in the frame buffer until after the display has been refreshed with the current frame of the GUI in the frame buffer. As shown, in this example, at a 30% or 40% processing load, the effective frame rate may be at or above the refresh rate of the display apparatus 104 (e.g., 60 Hz). But at a processing load of at or above 60%, the effective frame rate may be below the refresh rate. As shown in FIG. 7, the processing load reaches 60% between $1/60$ and $2/60$ s, during rendering frame 2 and before rendering frame 3. Thus, after rendering frame 2 (and after the TE signal) and before producing frame 3, the processing apparatus may measure its processing load and may estimate a target point in time when the next frame may be produced. In this example, similar to before, the target point in time may be a point between $3/60$ and $4/60$. The processing apparatus may then use this target point in time to identify frame 4 as the first frame at or after the target point in time. Instead of next producing frame 3, then, the processing apparatus may produce frame 4 as the next frame. At time $3/60$, frame 2 may again be pulled from the frame buffer for display. The processing apparatus may complete rendering frame 4 in the frame buffer before time $4/60$, and at time $4/60$ the display apparatus may pull frame 4 for display.

The processing apparatus 102 may be configured to determine the target point in time before producing each next frame, or may be configured to determine the target point in time only after the processing load reaches at least a predetermined level. Even further, the processing apparatus may be configured to determine the target point in time once before producing the next frame, but may be further configured to monitor the processing load thereafter to identify any change in the processing load. Thus, in an instance in which the processing load increases during production of a frame, the processing apparatus may again estimate the target point in time and identify the first next frame that may be produced by the target point in time. This is illustrated in FIG. 8 in which after determining that frame 3 may be produced within a target point in time $3/60$, the processing load increases from 30% to 60%. With this change, the target point in time may change from between $3/60$ and $4/60$ s. The processing apparatus may detect the change, recalculate the target point in time, and in this example, cease rendering frame 3 and begin rendering frame 4, which may then be available for pulling from the frame buffer at time $4/60$ s.

FIG. 9 illustrates a flowchart including various operations in a method according to example embodiments of the present invention. As shown in block 900, the method may include means such as the processor 202 for rendering a plurality of frames of an image (e.g., GUI) by a processing apparatus 102. The plurality of frames is rendered at a dynamic, effective frame rate, and each frame includes an associated point of time for having rendered the frame at a suppositional frame rate of the processing apparatus. Rendering the plurality of frames includes a plurality of operations, including as shown at block 902, means such as the processor for measuring a processing load of the processing apparatus. As shown at block 904, after rendering a current frame of the plurality of frames of the image, the method may include means such as the processor for estimating a target point in time at which the processing apparatus is capable of rendering a next frame of the plurality of frames of the image, where the target point in time is estimated as a function of the processing load. The method may then include means such as the processor for identifying a frame of the plurality of frames after the current frame having an associated point in time at or after the target point in time, as shown in block 906. And the method may include means such as the processor for rendering the identified frame of the plurality of frames, skipping rendering any frame between the current frame and identified frame.

B. Processing for Touch Input

Example embodiments of the present invention may additionally or alternatively improve the GUI "responsiveness" by reducing GUI displacement of a movable GUI element from touch positions of a motional touch gesture intended to move the respective GUI element. Consider, for example, the illustration of FIG. 10 in which a user may implement a dragging motional touch gesture to move a UI element from one point on a display to another point. As shown, as the user drags their touch point along the display, the UI element moves in response. But again, due to limited processing power and/or increases in processing load, a displacement between the touch point and UI element may develop as the user drags the touch point. This displacement may begin when the user begins dragging the touch point, and may cease when the touch point stops and the UI element catches up to it.

Example embodiments may more particularly improve the GUI "responsiveness" by spatial-temporal extrapolation of touch coordinates (spatial coordinates on the display and points in time) in order to estimate the next touch position and/or point in time from past samples (past touch positions), which may then be used to position the movable GUI element. This is shown, for example, in FIG. 11. In practice, the position and time of the latest l+1 touch points may be used as input for an extrapolation function that outputs an estimated next touch position at a future point in time. For purposes of illustration, the touch sampling rate and the frame rate of the UI elements in FIGS. 11-13 as written to a frame buffer are identical and temporally correlated. It should be understood, however, that this example of correlation may be equally applicable to uncorrelated systems where touch sampling and frame rates may be fully asynchronous.

The extrapolation function may be any of a number of functions configured to receive the appropriate input and provide the appropriate output as described herein. For example, the extrapolation function may be a non-linear approximation function (e.g., polynomial regression), as shown for example in FIG. 12. Alternatively, for example, the extrapolation function may be a linear approximation function (e.g., linear regression), as shown for example in FIG. 13. The displacement shown in FIG. 10 may therefore be reduced as shown, for example, in FIG. 14.

A more particular example of these embodiments in the context of a linear regression interpolation function is shown in FIG. 15. In this example, the intercept point b and slope m of a linear regression function of a straight line $y(t)=mt+b$ with l+1 data points $(t_i|y_i)$ may be expressed as follows:

$$b = \frac{\sum_{i=0}^{-l} y_i - m \sum_{i=0}^{-l} t_i}{l+1}$$

$$m = \frac{(l+1)\sum_{i=0}^{-l} t_i y_i - \sum_{i=0}^{-l} t_i \sum_{i=0}^{-l} y_i}{(l+1)\sum_{i=0}^{-l} t_i^2 - \left(\sum_{i=0}^{-l} t_i\right)^2}$$

In instances in which the touch coordinate samples are equidistant (e.g., periodic equidistant touch events), the aforementioned functions may be simplified to:

$$y_p = \sum_{i=-l}^{-l} c_i(l, t_p) y_i, \text{ where}$$

$$c_i(l, t_p) = \frac{1}{l+1} + \frac{3(l+2t_p)}{(l+1)(l+2)} + \frac{6(l+2t_p)}{l(l+1)(l+2)} i$$

Equidistant touch coordinate samples are shown, for example, in FIG. 16. As shown, consider an example with synchronous touch sample and frame rate in which $$y_p = \sum_{i=0}^{-l} c_i(l, t_p) y_i$$

$t_p=4$ frames of extrapolation of a future touch position, and a linear regression length with l=8. In this example, the coefficients $c_i$ may be expressed as follows:

$$c_i(l, 4) = \frac{1}{9} + \frac{48}{90} + \frac{96}{720} i = \frac{58}{90} + \frac{96}{720} i$$

In this and similar examples, these coefficients may be pre-calculated and stored to non-volatile memory, so that only (l+1) multiplications and l additions are calculated for each extrapolated touch position $y_p$. FIG. 17 illustrates another example in which $$y_p = \sum_{i=0}^{-l} c_i(l, t_p) y_i$$

t=5 frames.

FIG. 18 illustrates a flowchart including various operations in a method according to example embodiments of the present invention. As shown in block 1800, the method may include means such as the processor 202 for receiving an indication of a motional touch gesture to move a graphical user interface (GUI) element on a display. The motional touch gesture includes a plurality of successive touch positions on the display at a corresponding plurality of points in time. In response to receiving the indication of the motional touch gesture, the method may include means such as the processor for directing presentation of the GUI element on the display at a plurality of successive positions at the corresponding plurality of points in time to thereby represent movement of the GUI element on the display, as shown in block 1802. In this regard, the plurality of successive positions of the GUI element is representative of the plurality of successive touch positions. As shown in block 1804, for directing presentation of the GUI element, the method may include means such as the processor for extrapolating a position of the GUI element for a given point in time based on a number of the touch positions at points in time prior to the given point in time, and based on an extrapolation function into which the number of touch positions are input. And the method may include means such as the processor for directing presentation of the GUI element at the extrapolated position at the given point in time, as shown in block 1806.

According to one aspect of the example embodiments of present invention, functions performed by the system 100 and/or apparatus 200, such as those illustrated by the flowcharts of FIGS. 9 and 18, may be performed by various means. It will be understood that each block or operation of the flowcharts, and/or combinations of blocks or operations in the flowcharts, can be implemented by various means. Means for implementing the blocks or operations of the flowcharts, combinations of the blocks or operations in the flowcharts, or other functionality of example embodiments of the present invention described herein may include hardware, alone or under direction of one or more computer program code instructions, program instructions or executable computer-readable program code instructions from a computer-readable storage medium. In this regard, program code instructions may be stored on a memory device, such as the memory device 204 of the example apparatus, and executed by a processor, such as the processor 202 of the example apparatus. As will be appreciated, any such program code instructions may be loaded onto a computer or other programmable apparatus (e.g., processor, memory device, or the like) from a computer-readable storage medium to produce a particular machine, such that the particular machine becomes a means for implementing the functions specified in the flowcharts' block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' block(s) or operation(s).

Accordingly, execution of instructions associated with the blocks or operations of the flowcharts by a processor, or storage of instructions associated with the blocks or operations of the flowcharts in a computer-readable storage medium, supports combinations of operations for performing the specified functions. It will also be understood that one or more blocks or operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus comprising:
at least one processor; and
at least one memory including computer program code,
the at least one memory and the computer program code configured to, with the at least one processor, cause the apparatus to at least:
render a plurality of frames of an image, the plurality of frames being rendered at a dynamic, effective frame rate, each frame including an associated point of time for having rendered a respective frame at a suppositional frame rate of the apparatus, wherein rendering the plurality of frames includes:
measure a processing load of the apparatus;
estimate, after rendering a current frame of the plurality of frames of the image, a target point in time at which the apparatus is capable of rendering a next frame of the plurality of frames of the image, the target point in time being estimated as a function of the processing load;
identify a first frame of the plurality of frames after the current frame having an associated point in time at or after the target point in time;
render the first identified frame of the plurality of frames, skipping rendering any frame between the current frame and first identified frame;
wherein estimating the target point in time and identifying the frame of the plurality of frames occur in a first instance to identify a given frame of the plurality of frames, and again during rendering the identified first frame, and in a respective instance in which the processing load increases, a second frame of the plurality of frames is identified, and wherein in the respective instance, the at least one memory and the computer program code are further configured to, with the at least one processor, cause the apparatus to further:

cease to render the identified first frame of the plurality of frames; and render the identified second frame of the plurality of frames.

2. The apparatus of claim 1, wherein the apparatus is caused to estimate the target point in time further including a headroom period of time.

3. The apparatus of claim 1, wherein the apparatus is caused to render the plurality of frames for presentation by a display apparatus having a refresh rate, the suppositional frame rate being less than or equal to the refresh rate.

4. The apparatus of claim 1, wherein the apparatus is caused to estimate the target point in time only after the processing load reaches at least a predetermined level.

5. A method comprising:

rendering a plurality of frames of an image by a processing apparatus, the plurality of frames being rendered at a dynamic, effective frame rate, each frame including an associated point of time for having rendered a respective frame at a suppositional frame rate of the processing apparatus, wherein rendering the plurality of frames includes:

measuring a processing load of the processing apparatus;

estimating, after rendering a current frame of the plurality of frames of the image, a target point in time at which the processing apparatus is capable of rendering a next frame of the plurality of frames of the image, the target point in time being estimated as a function of the processing load;

identifying a first frame of the plurality of frames after the current frame having an associated point in time at or after the target point in time;

rendering the identified first frame of the plurality of frames, skipping rendering any frame between the current frame and the identified first frame;

wherein estimating the target point in time and identifying the frame occur in a first instance to identify a given frame of the plurality of frames, and again during rendering the identified first frame, and in a respective instance in which the processing load increases, a second frame of the plurality of frames is identified, and wherein the method further comprises in the respective instance:

cease rendering the identified first frame of the plurality of frames; and rendering the identified second frame of the plurality of frames.

6. The method of claim 5, wherein estimating the target point in time includes estimating the target point in time further including a headroom period of time.

7. The method of claim 5, wherein rendering the plurality of frames includes rendering the plurality of frames for presentation by a display apparatus having a refresh rate, the suppositional frame rate being less than or equal to the refresh rate.

8. The method of claim 5, wherein rendering the plurality of frames is performed by a computer program product comprising a non-transitory computer-readable storage medium having computer-readable program code portions stored therein, the computer-readable storage medium and computer-readable program code portions being configured to, with a processor, cause an apparatus to at least render the plurality of frames.

* * * * *